United States Patent [19]

Paramonov et al.

[11] Patent Number: 5,512,321
[45] Date of Patent: Apr. 30, 1996

[54] PROCESS FOR COATING ELONGATED MATERIALS WITH MULTIPLE LAYERS

[75] Inventors: Vladimir A. Paramonov; Anatolij I. Tychinin; Anatolij I. Moroz, all of Moskau, Russian Federation; Boris L. Birger, Riga, Latvia

[73] Assignees: Mannesmann Aktiengesellschaft, Dusseldorf, Germany; I.P. Bardin Central Research Institute of Iron and Steel Industry, Moscow, U.S.S.R.; SKB MGD, Institute of Physics, Riga, Latvia

[21] Appl. No.: 302,765

[22] Filed: Nov. 18, 1994

[30]      Foreign Application Priority Data

Mar. 13, 1992 [DE]   Germany ........................... 42 08 577.2

[51] Int. Cl.$^6$ ..................................................... B05D 1/36
[52] U.S. Cl. ........................ 427/405; 427/431; 427/434.2; 427/436; 118/423; 118/429
[58] Field of Search ..................... 427/405, 431, 427/434.2, 436; 118/423, 429

[56]             References Cited

U.S. PATENT DOCUMENTS 4,607,682   8/1986   Pantzig et al. ........................... 164/418
4,844,147   7/1989   Tominaga et al. ........................ 164/450
5,261,611   11/1993  Huxford .................................... 239/690

FOREIGN PATENT DOCUMENTS 2080833   2/1982   United Kingdom .............. C23C 1/02

Primary Examiner—Benjamin Utech
Attorney, Agent, or Firm—Cohen, Pontani, Lieberman, Pavane

[57]                     ABSTRACT

The invention is directed to a process for coating elongated metallic material, particularly strip or wire, with multiple layers by applying different layers of metallic coating materials while the material to be coated travels continuously through an installation having a plurality of dip baths of molten coating materials which are arranged one after the other.

In order to produce new corrosion-resistant coatings with improved properties and improved surfaces, the invention provides that the elongated metallic material is guided in a straight line through the installation so as to be regulated in temperature via the adjustable bath temperatures of the different molten coating materials. The device used for this purpose is characterized by a plurality of treatment tanks (4a, 4b) arranged in series and having through-ducts (12) for the elongated metallic material (B) below the surface (h) of the dip bath, the through-ducts (12) being closed by magnetohydrodynamic seals (13).

10 Claims, 4 Drawing Sheets

PROCESS FOR COATING ELONGATED MATERIALS WITH MULTIPLE LAYERS

BACKGROUND OF THE INVENTION

1. Field of the Invention

The invention is directed to a process for coating elongated metallic material, particularly strip or wire, with multiple layers by applying different layers of metallic coating materials while the material to be coated travels continuously through an installation having a plurality of dip baths with molten coating materials.

2. Description of Prior Art

Processes of the type described above are known (GB 15 74 814) and are used to improve surfaces, in particular to improve the resistance of metal strips or metal wires to corrosion. The coating materials which are applied in multiple layers, e.g. a first layer of aluminum/5–12% silicon and a second layer of aluminum, also improve the deformation properties of the strip and the adhesive strength and corrosion resistance of the coating material. In another known process (DE-A1-31 24 161), a steel strip whose surface has been prepared is guided through two adjacent tanks one after the other. The first tank contains a zinc bath and the second contains an alloy bath and the bath temperatures of both tanks can be regulated. The accompanying device provides means and steps for introducing the strip into the tank, deflecting it therein and then guiding it out of the tank and into and out of the next tank. In a known manner, wipers remove excess coating material from the coated strip as it leaves the second tank and, at the same time or subsequently, the strip is brought to a temperature at which the coating material solidifies in its entirety. In this way the surface quality and adhesive capacity of the coating is improved.

A disadvantage in the known process and in the known device consists in that it is not possible to exert a directed influence on the diffusion process between the molten coating material and steel strip or to bring optimal temperature conditions into precise accord during the application of the first and second coating layers. As a result of the arrangement of adjacent tanks with required deflecting means for the strip, restrictions are imposed on the minimum coating time since it is impossible to guide the material to be coated on a direct path. Moreover, in the given arrangement of the installation, contamination of the dip baths by iron is inevitable so that the quality of the coated material is impaired.

A device for guiding cast bar material in a straight line through an individual, vertically arranged tank in which the level of the dip bath is adjustable is known from DE-A-36 38 249.

SUMMARY OF THE INVENTION

Proceeding from the problems and disadvantages of the prior art discussed above, the present invention has the object of improving the known coating process. Optimized regulating of the diffusion processes during application of the coating ensures a greater influence on the thickness and adhesion of the intermediate layer and the adhesion of each additional layer so that new corrosion-resistant coatings with improved properties and improved surfaces can be achieved by means of the improved devices and arrangements.

This object is met according to the invention by a process which is characterized in that the elongated metallic material is guided in a straight line through the installation in a regulated manner with respect to temperature and time via the adjustable bath temperatures and/or bath levels of the different molten coating materials. Accordingly, it is possible to adjust an improved and regulated temperature control of the elongated material and its coating so that the respective treatment temperature and treatment time required for the coating or for the formation of intermetallic intermediate layers can be adjusted.

In a particularly advantageous embodiment of the invention, each layer of coating material applied to the elongated metallic material is cooled in the next dip bath following in the traveling direction at a temperature equal to or below the solidification temperature of the element in the previously applied layer having the lowest melting temperature. In this way the dip baths themselves can be used to control temperature in that the bath temperature and/or the bath level and treatment time are appropriately adapted to one another.

According to another feature of the invention, it is also possible, of course, for one or more layers applied to the elongated metallic material to be exposed in the following dip bath, with reference to the direction of travel, to a temperature which is higher than the solidification temperature of the layer or layers applied in one of the previous dip baths. This is useful when the first applied layer serves as a barrier layer for additional coatings and is mixed together with the additional applied coating as a flux.

In a development of the invention, the final layer applied to the elongated metallic material after leaving the dip bath is rapidly cooled to a temperature equal to or below the solidification temperature of this layer and is then reduced in thickness by 0.3 to 3%. The surface and grain or texture of the coating is improved in conclusion by means of this deformation step.

A device according to the invention for carrying out the process is characterized by a plurality of treatment tanks arranged in series and having through-ducts for the elongated metallic material below the surface of the dip bath, the through-ducts being closed by magnetohydrodynamic seals.

With tanks of this type arranged in such a way, it is possible to guide the elongated metallic materials in a straight line, which is important for carrying out the process according to the invention since it does away with disadvantageous deflecting rolls and guiding rolls for directing the materials into and out of the dip baths. Accordingly, the time between individual coating steps can be kept short enough to enable a regulated temperature control of the elongated material and the coating of this material.

In a preferred construction of the invention, the coating tanks are arranged vertically one above the other. In this case, the magnetohydrodynamic seals are arranged around the through-duct which is guided through the base of the individual coating tanks through which the elongated materials travels downward or upward vertically. As in all embodiments of the invention, the entire installation is kept out of contact with atmospheric oxygen and operated in a protective gas atmosphere.

In a particularly advantageous solution for carrying out the process, at least one pre-melt tank is associated with every coating tank and the melt can be circulated out of contact with air between the pre-melt tank and the coating tank. The associated with every coating tank and the melt can be circulated out of contact with air. The coating tanks are preferably many times smaller in volume than the pre-melt tank or pre-melt tanks associated with them. The use of such pre-melt tanks of greater volume makes it possible for the actual coating tanks to be constructed so as to have a small volume of coating material. As a result, the level of the coating material bath can be lowered or raised very quickly and the treatment time of the elongated material passing through it can be varied. The temperature of the supplied melt of coating material can also be regulated much more quickly than would be possible if there were a large volume of coating material to be cooled or heated. The smelting of the coating material can then be effected in the pre-melt tank arranged next to or laterally below the coating tank, the coating material being circulated between the pre-melt tank and the coating tank, e.g., by means of magnetic pumps.

It is important that the temperature and/or level of the coating material dip bath can be adjusted in each coating tank.

Further to the construction of the installation according to the invention, it is provided according to another feature of the invention that the elongated metallic material is guided around a deflecting roll after the final coating tank—as viewed in the direction of travel—or in an additional coating tank, an after-roll stand for the coated material being arranged downstream of this deflecting roll. The deflecting roll deflects the coated elongated material into a plane in which the after-rolling of the coated material is possible. Moreover, an additional cooling device can be arranged between the deflecting roll and the after-roll stand so as to influence the temperature of tile coated strip prior to the shaping or deforming process.

In another construction of the invention, it is suggested that when the deflecting roll is arranged in the additional coating tank the elongated material is guided into and out of the dip bath and tile deflecting roll can be raised and lowered within the dip bath. In this proposed arrangement, an additional tank with molten coating material whose temperature can be regulated is provided below the final coating tank according to the invention. In this way, the coated elongated material can be cooled to tile desired temperature within this tank and the treatment time in the tank can be influenced by displacing the deflecting roll vertically. A jet blade for removing excess coating material from the surface of the material to be coated can be arranged downstream of the additional tank in a known manner.

The invention is described in more detail with reference to an embodiment example of the invention shown in the drawing.

DETAILED DESCRIPTION OF THE PREFERRED EMBODIMENT

Figure 1:
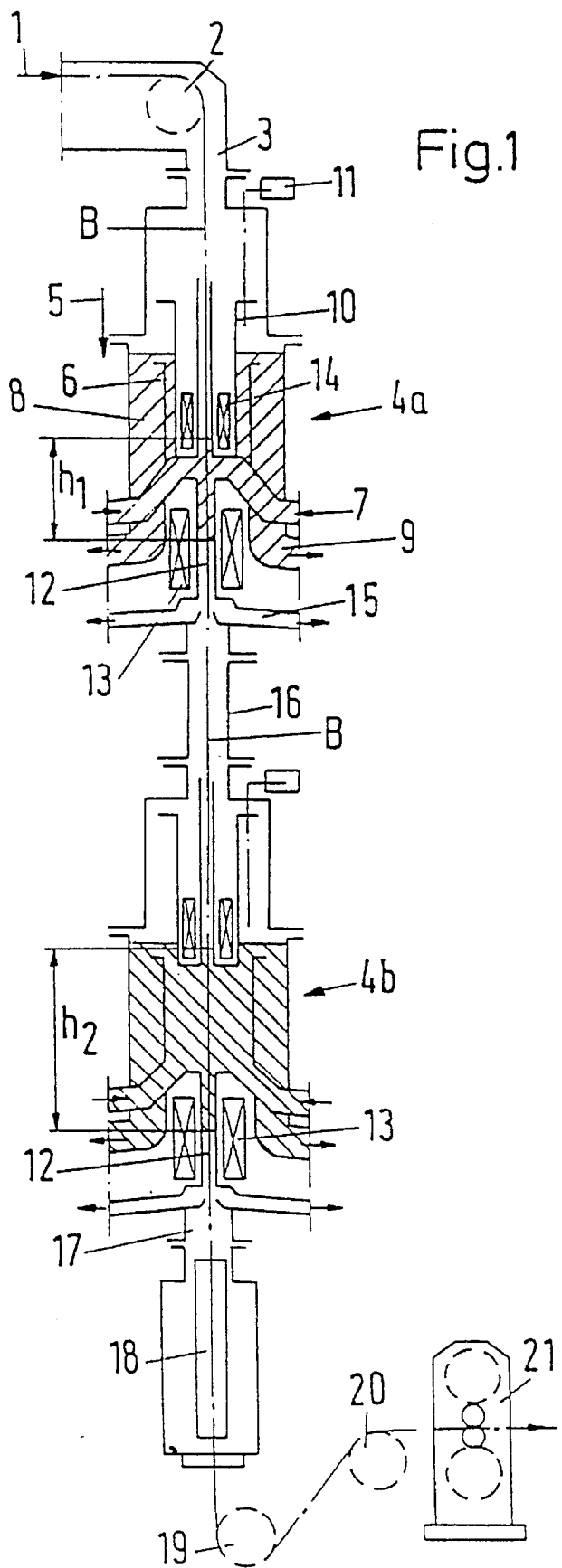
FIG. 1 is a schematic view of a device according to the invention for coating a strip with multiple layers.

The installation according to the invention is shown in partial section in a roughly schematic manner in FIG. 1. A steel strip B entering from a strip preparation process (annealing furnace) in the direction of arrow 1 is guided around a deflecting roll 2 from the horizontal to the vertical. The strip B is guided in a duct 3 so as to be out of contact with the environmental air. A protective gas within the duct prevents oxidation of the surface of the strip. Two coating tanks which are arranged one after the other, i.e. vertically one above the other, in the traveling direction 5 of the strip are designated by 4a and 4b. Each coating tank 4a, 4b has an inner vessel 6 and an outer vessel 8. The molten coating material is delivered to the inner vessel 6 at reference number 7 from a pre-melt tank (not shown), e.g., by means of magnetic pumps, and can be returned to the pre-melt tank through outlet ducts 9 via the outer vessel 8. An immersion body 10 is inserted into the inner vessel 6 at 11 in such a way that it can be raised and lowered so as to change the effective level h1 of the coating material bath. The through-duct 12 for the strip B at the base of the inner vessel 6 is closed by a known magnetohydrodynamic seal as indicated by coil 13. This magnetohydrodynamic seal provides an electromagnetic barrier preventing the molten metallic coating material from flowing out of the through-duct.

A similar seal 14 is provided within the immersion body 10 in order to prevent an increase in the level of the liquid coating material in the immersion body 10 preventing a defined adjustment of the treatment bath level h1.

Additional ducts 15 below the through-opening for the strip intercept molten coating material in the event of leaking or operating disturbance and guide it back into the pre-melt tank of the respective coating tank.

The construction of coating tank 4b is identical to that of tank 4a, for which reference is made to the description of the latter. Another pre-melt tank or a plurality of other pre-melt tanks is/are associated with coating tank 4b. Accordingly, it is possible to supply different coating materials. A closed duct 16 in a protective gas atmosphere is provided between the coating tanks 4a and 4b so that a determined temperature can be adjusted between the coating tanks 4a and 4b. A duct 17 forming the conclusion of the system is provided below the coating tank 4b or on the outlet side thereof, the strip passing through this duct 17 into the cooling section 18. The strip is deflected by deflecting rolls 19 and 20 upstream of a roll stand 21 in which the coated strip is after-rolled.

Figure 2:
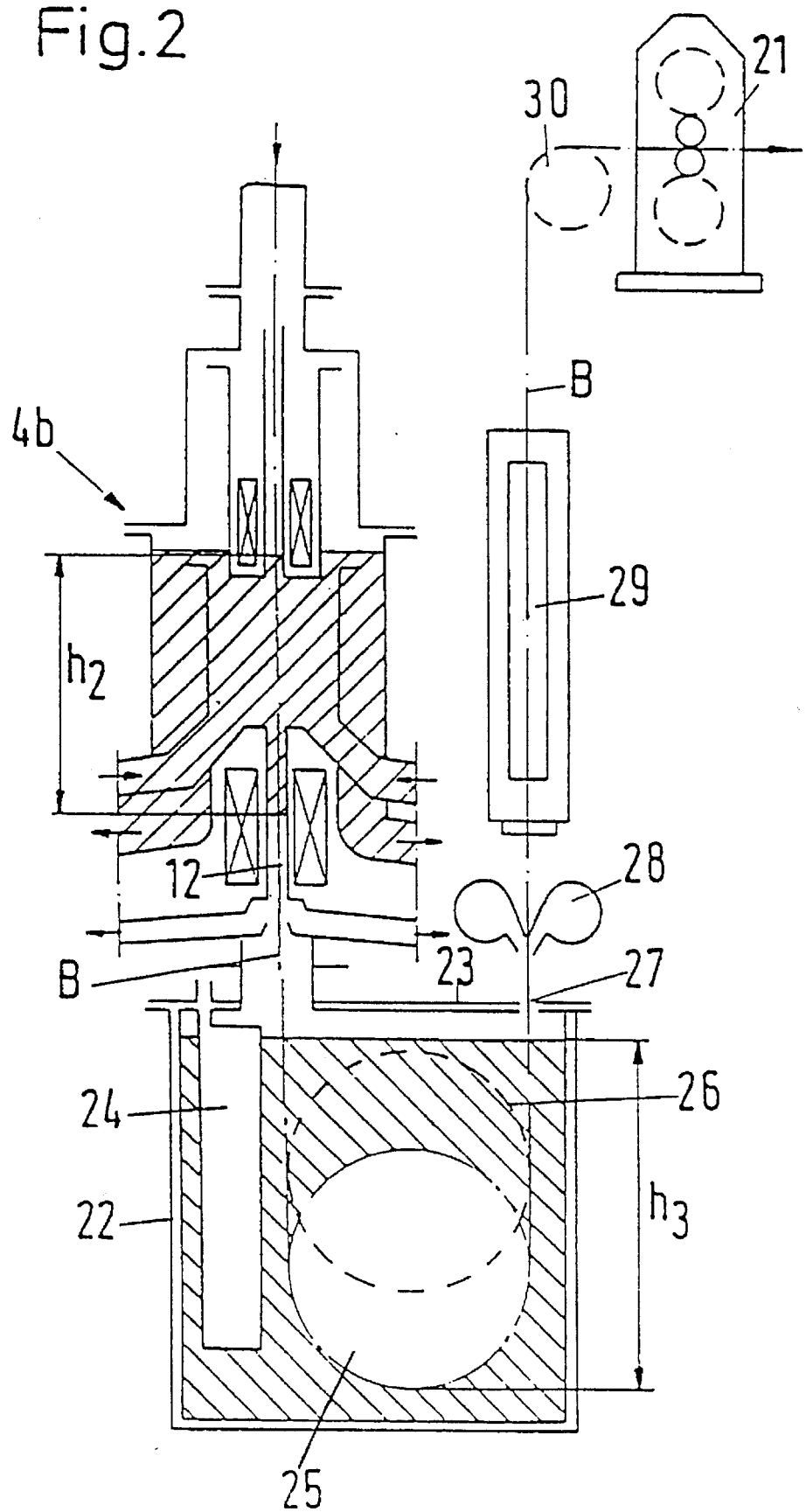
FIG. 2 shows an embodiment of the installation according to the invention with deflecting roll in the dip bath.

An alternative construction of the delivery or outlet region of the treatment section is shown in FIG. 2. After the coating tank 4b, whose construction has already been described with reference to FIG. 1, the strip B arrives in an additional coating tank 22 which is closed by a cover 23. The coating tank 22 also contains a melt of coating material whose temperature is equal to or below the solidification temperature of the last coating. Heating of the melt to undesirable temperatures is prevented by a cooling device 24, the temperature of the melt being adjustable by means of tile latter. The treatment time, i.e. the time during which the strip runs through the melt, can be varied in that the deflecting roll 25 is vertically adjustable in the melt as shown by the dash-dot line 26. The strip B exiting the additional coating tank 22 at 27 is first guided through a known jet blade 28 which removes excess coating material. It then travels through a cooling section 29 and is directed to a roll stand 21 after being deflected by a deflecting roll 30. In this way, the device and the process according to the invention make it possible to coat the strip as it travels vertically through different dip baths one after the other. The first coating generally hardens in the following dip bath at the same time that another layer is being applied. The final layer is cooled until solidified and then deformed.

Figure 3:
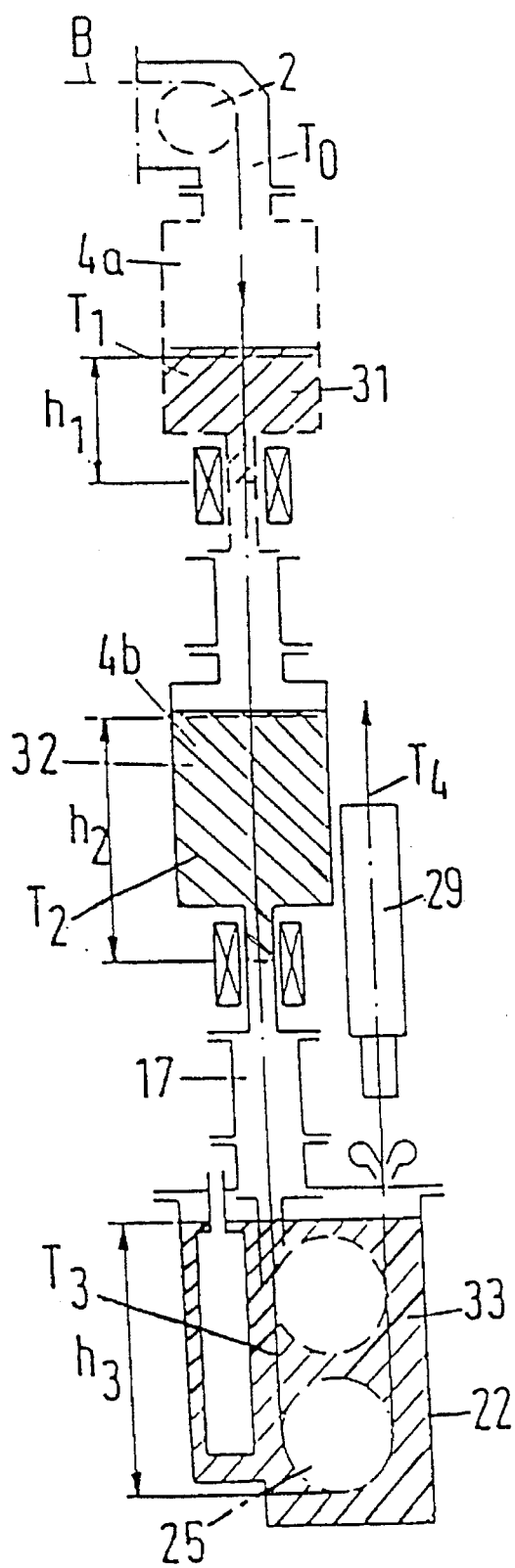
FIGS. 3 and 4 illustrate the temperature control of an inventive embodiment.

Embodiment examples of the process according to the invention are shown in FIG. 3 and FIG. 4. The cold-rolled steel strip B is deflected in the vertical direction by the deflecting roll 2 after annealing and pretreatment and is introduced into the first coating tank 4a. The molten coating material, designated here by 31, is adjusted at a bath level h1 in the coating tank 4a and has temperature $T_1$. The strip B is heated to and maintained at temperature $T_O$ when it reaches the installation according to the invention.

The strip coated in the coating tank 4a with coating material 31 is guided at the appropriate temperature into the treatment tank 4b where it is dipped in the molten coating material 32. The bath level of the coating material 32 is designated by h2 and, as it is higher, denotes a treatment time which is longer than that carried out in coating tank 4a. The temperature in the coating tank 4b is adjusted to $T_2$.

The strip exiting the coating tank 4b passes through the duct 17 into the additional tank 22 in which the molten coating material 33 is adjusted to temperature $T_3$. The final coating is applied in tank 22, whereupon the strip is chilled to temperature $T_4$ in the cooling section 29.

FIGS. 4A, 4B, 4C, and 4D shows the temperature curve of four differently managed installations by way of example.

Figure 4A:
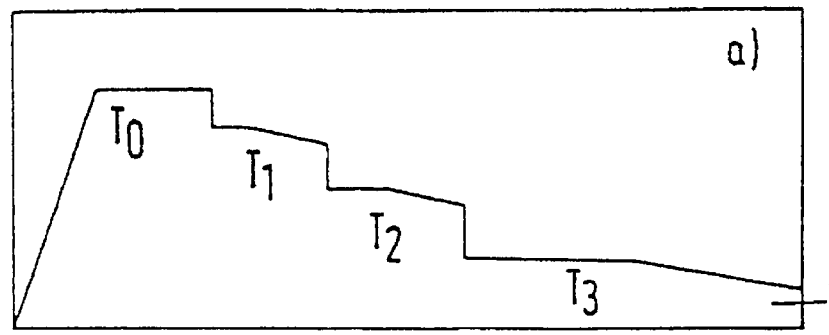

In FIG. 4A, a coating with three layers is carried out, wherein the steel strip at input temperature $T_O$ is guided through successive melt baths at temperatures $T_1 > T_2 > T_3$ and is then cooled to temperature $T_4$.

Figure 4B:
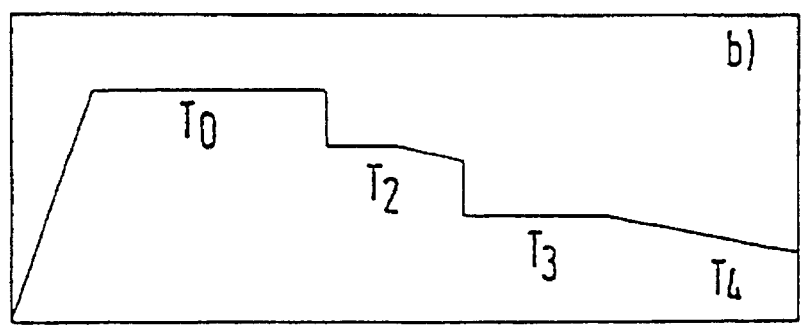

FIG. 4B shows a coating with two layers, wherein the steel strip is guided through successive dip baths at temperatures $T_2 > T_3$.

Figure 4C:
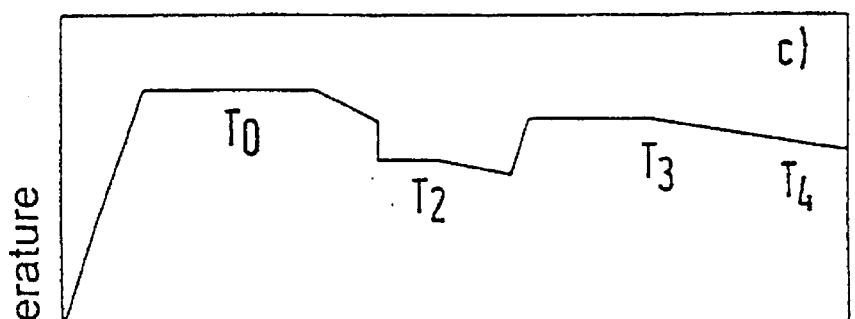

In FIG. 4C, coating is also carried out with two layers, wherein, in contrast to FIG. 4B, the steel strip is guided through successive dip baths at temperatures $T_2 < T_3$.

Figure 4D:
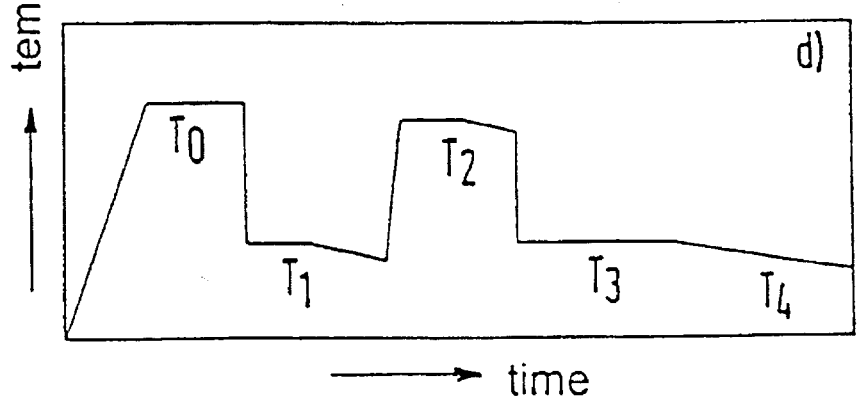

Finally, FIG. 4D shows a coating with three layers, wherein the steel strip is guided through successive dip baths with temperatures $T_1 < T_2 > T_3$.

Naturally, other variations are also conceivable and possible. As a result of the described process and accompanying device it is possible to carry out a coating process which is controllable in a particularly exact manner in which the diffusion processes in coating the steel strip can be adjusted in a very precise manner. Each of the applied layers has excellent adhesion. By combining a plurality of coating dip baths it is possible to obtain novel corrosion-resistant layers.

We claim:

1. A process for coating elongated metallic material with multiple layers of metallic coating materials, comprising the steps of: providing a plurality of dip baths of molten coating materials arranged above one another in series; linearly guiding the elongated metallic material continuously through the plurality of dip baths in a travel direction defined by a single vertical line; sealing the baths with magnetohydrodynamic seal means to prevent outflow of the molten coating materials in the bath: and, regulating the guiding of the elongated metallic material with respect to temperature and time by at least one of adjusting bath temperatures and bath levels of the molten coating materials.

2. A process according to claim 1, including cooling each layer of coating material applied to the elongated metallic material in one of the dip baths in a subsequent one of the dip baths, relative to the travel direction, at a temperature equal to no more than the solidification temperature of a previously applied layer having a lowest melting temperature.

3. A process according to claim 1, including exposing at least one layer applied to the elongated metallic material in a subsequent one of the dip baths, relative to the travel direction to a temperature which is higher than the solidification temperature of the at least one layer applied in a previous dip bath.

4. A process according to claim 1, including cooling a final layer applied to the elongated material after leaving the dip bath to a temperature equal to no more than the solidification temperature of the final layer, and subsequently rolling the elongated material to reduce thickness by 0.3 to 3%.

5. A device for coating elongated metallic material, comprising: a plurality of coating tanks each containing a dip bath and being arranged in series, each of the tanks having a through-duct for the elongated metallic material, which through-duct is arranged below the surface of the dip bath; magnetohydrodynamic seal means for closing the through-ducts; and means for adjusting at least one of temperature and dip bath level of the coating material in each of the coating tanks.

6. A device according to claim 5, wherein the coating tanks are arranged vertically above one another.

7. A device according to claim 5, and further comprising at least one pre-melt tank associated with each of the coating tanks, and means for circulating molten coating material between the pre-melt tank and the coating tank out of contact with air.

8. A device according to claim 7, wherein the coating tanks have a smaller volume than that of the pre-melt tanks associated with them.

9. A device according to claim 5, wherein the plurality of coating tanks includes a final coating tank as viewed in a travel direction of the elongated metallic material, and further comprising a deflecting roll arranged after the final coating tank so that the elongated metallic material is guidable around the deflecting roll, and still further comprising an after-roll stand arranged downstream of the deflecting roll for rolling the coated material.

10. A device according to claim 9, and further comprising an additional coating tank containing a dip bath and arranged after the final coating tank in the travel direction of the metallic material, the deflecting roll being arranged in the additional coating tank so that the deflecting roll can be raised and lowered within the dip bath and so that the elongated material is guidable around the deflecting roll into and out of the dip bath.

* * * * *